US007846876B2

(12) United States Patent
Koyanagi et al.

(10) Patent No.: US 7,846,876 B2
(45) Date of Patent: Dec. 7, 2010

(54) SURFACTANT COMPOSITION

(75) Inventors: Koji Koyanagi, Wakayama (JP); Sadahara Miyamoto, Wakayama (JP); Hotaka Yamamuro, Wakayama (JP)

(73) Assignee: Kao Corporation, Tokyo (JP)

( * ) Notice: Subject to any disclaimer, the term of this patent is extended or adjusted under 35 U.S.C. 154(b) by 921 days.

(21) Appl. No.: 10/574,900

(22) PCT Filed: Oct. 6, 2004

(86) PCT No.: PCT/JP2004/015106

§ 371 (c)(1),
(2), (4) Date: Feb. 28, 2007

(87) PCT Pub. No.: WO2005/035686

PCT Pub. Date: Apr. 21, 2005

(65) Prior Publication Data

US 2008/0058227 A1 Mar. 6, 2008

(30) Foreign Application Priority Data

Oct. 7, 2003 (JP) ............................ 2003-348461

(51) Int. Cl.
*C09K 8/36* (2006.01)
*C09K 3/00* (2006.01)
*C09K 8/60* (2006.01)
*B01J 13/00* (2006.01)

(52) U.S. Cl. ......................... 507/129; 516/99; 516/102; 516/104; 516/108; 516/73; 516/58; 516/66; 516/67; 507/222

(58) Field of Classification Search .................. 516/66, 516/58, 67, 73, 76, 102, 104, 108, 99; 507/129, 507/222
See application file for complete search history.

(56) References Cited

U.S. PATENT DOCUMENTS 4,176,107 A * 11/1979 Buckman et al. ............ 524/317
4,393,939 A 7/1983 Smith et al.
2003/0209695 A1 11/2003 Tsuzuki et al.

FOREIGN PATENT DOCUMENTS

EP 1266875 A2 * 12/2002
JP 57-190075 11/1982
JP 5-39901 A 6/1993
JP 11-189452 A 7/1999
JP 2001-81448 A 3/2001
JP 2001-220196 A 8/2001
JP 2002-60790 A 2/2002
JP 2003-238222 A 8/2003
JP 2003-238997 A 8/2003
JP 2003-261860 9/2003

OTHER PUBLICATIONS

Japanese Office Action mailed on Jan. 19, 2010 in corresponding Japanese Patent Application No. 2004-271336.

* cited by examiner

*Primary Examiner*—Timothy J. Kugel
*Assistant Examiner*—Aiqun Li
(74) *Attorney, Agent, or Firm*—Birch, Stewart, Kolasch & Birch, LLP

(57) ABSTRACT

The present invention relates to a surfactant composition containing a cationic surfactant (hereinafter referred to as a compound (A)), one or more compounds (hereinafter referred to as a compound (B)) selected from anionic aromatic compounds and bromide compounds and a cationic polymer (C), wherein compound (A) and (B) are selected when meeting the following condition: a combination of the compounds (A) and (B) ensures that that the viscosity (20° C.) of a solution prepared by mixing an aqueous solution $S_A$ of the compound (A) and an aqueous solution $S_B$ of the compound (B) in the same ratio is at least two times the viscosity of any one of the aqueous solutions (20° C.) before being mixed.

12 Claims, No Drawings

SURFACTANT COMPOSITION

FIELD OF THE INVENTION

The present invention relates to a surfactant composition which can be used for example as a rheology modifier controlling slurry viscosity, and, more particularly, a rheology modifier for a water-powder slurry containing a powder used for civil/construction materials, concrete product materials and repairing materials and a slurry containing the modifier.

BACKGROUND OF THE INVENTION

Generally, techniques in which the ratio of water to a powder, the dispersion condition of particles is changed by a pH regulator or a water-absorbing polymer is added to control excess water have been used to control the rheology characteristics, such as viscosity, of a slurry containing water and the powder.

In particular, the techniques in which a water-soluble polymer compound is added to a slurry system to make use of the thickening effect produced by the tanglement of the polymers ensure a large thickening effect at low costs and are put to practical use in a wide range of applications including civil/construction fields. For example, cellulose derivatives such as methyl cellulose and hydroxyethyl cellulose disclosed in JP-B5-39901 and water-soluble polymer compounds such as a poly(ethylene oxide) disclosed in JP-A11-189452 are used for pastes, mortars, underwater concretes, self-compacting concretes and the like to improve segregation resistance of materials.

Also, when a water-soluble polymer is used for a paste, mortar and concrete, many formulations in which the ratio of a powder is small (ratio of water/powder: 30% or more) are used. Formulations having a larger water-to-powder ratio are more reduced in the stability of viscosity with time and tend to give rise to segregation such as an outflow of bleeding water.

The pipe jacking method is one in which a drilling machine is attached to the distal end of a driving pipe (e.g., reinforced concrete pipe, hard vinyl chloride pipe, steel pipe and cast iron pipe) manufactured in factories and the pipe is pressed into the ground by the driving force of a jack to construct a pipe channel. The pipe jacking method is roughly classified into three construction methods, namely, “cutting edge pipe jacking method”, “closed type pipe jacking method” and “small-diameter pipe jacking method”. Particularly, the closed type pipe jacking method includes, for example, a mud pressure type pipe jacking method. In this method, while a “pipe jacking additive” is injected to promote the plastic and fluid properties of drilled sediment, it is mixed with drilled sediment by a drilling head, pressure is applied to the sediment by the driving force of a main pushing jack, the sediment’s pressure is applied effectively on the whole cutting edge and the sediment is discharged with a screw conveyer, while maintaining the stability of the cutting edge, thereby to proceed in drilling.

The pipe jacking additive of pipe jacking method is used in the following cases: (1) where soil cannot be discharged smoothly even together with water, because of lack of fine grain content, in drilling in ground having a large coefficient of permeability, a lot of spring water and a small content of clay and silt, also called fine grain content, that is, soil having a particle diameter of 0.075 mm or less; or (2) where soil having a high porosity and a poor grain balance is converted to sludge having plastic and fluid properties and non-permeability.

As to, particularly, hydraulic compositions, in the meantime, there is a description concerning a hydraulic composition additive prepared by combining specified first and second compounds as a hydraulic composition additive which raises the viscosity and fluidity of concretes and the like and can impart excellent characteristics as to segregation resistance of aggregates, cement and water in JP-A2003-238222.

The additive described in JP-A2003-238222 is regarded as an additive that can impart excellent characteristics as to segregation resistance to a hydraulic composition as a slurry.

SUMMARY OF THE INVENTION

The present invention relates to a surfactant composition containing a cationic surfactant (hereinafter referred to as a compound (A)), at least one compound (hereinafter referred to as a compound (B)) selected from anionic aromatic compounds and bromide compounds, and a cationic polymer (C), wherein compounds (A) and (B) are selected for the surfactant composition when meeting the condition wherein a combination of the compounds (A) and (B) ensures that the viscosity (20° C.) of a solution prepared by mixing an aqueous solution $S_A$ (viscosity at 20° C.: 100 mPa·s or less) of compound (A) with an aqueous solution $S_B$ (viscosity at 20° C.: 100 mPa·s or less) of compound (B) in a ratio by weight of 50/50 is at least two times the viscosity of any one of the aqueous solutions (20° C.) before being mixed.

The invention also provides a kit to obtain the above described surfactant composition, containing a combination of a composition (α) containing the compound (A), a composition (β) containing the compound (B) and a composition (γ) containing the cationic polymer (C) or a combination of a composition (I) which contains any two of the compound (A), the compound (B) and the cationic polymer (C) but does not contain the remainder one and a composition (II) containing the remainder one which the composition (I) does not contain.

The invention also provides a method of use of the above described surfactant composition as a slurry rheology modifier, a slurry rheology modifier containing the above shown surfactant composition, a slurry containing the above described surfactant composition, water, a hydraulic powder and/or a filler other than clay and clay, a method of modifying slurry rheology having the step of adding the above described surfactant composition to the slurry or a method of modifying slurry rheology with the above shown kit.

The invention also provides a slurry rheology modifier containing the above described surfactant composition of the present invention, hereinafter called slurry rheology modifier of the present invention. The invention provides a method of modifying slurry rheology with the above described surfactant composition.

The invention provides a method of pipe jacking, including using the above shown slurry as a pipe jacking additive and use of the above shown slurry as a pipe jacking additive for pipe jacking method.

DETAILED DESCRIPTION OF THE INVENTION

However, it is necessary to use a compound having a molecular weight more than a certain order to obtain an effective thickening effect by using a water-soluble polymer compound. Compounds used actually as the foregoing compound almost have a molecular weight of hundred thousands or more.

These water-soluble polymer compounds having so large a molecular weight has to be mixed and so much kneaded with water and powder, for a long time, to obtain a satisfactory viscosity. No good thickening result can be obtained rapidly. Besides an aqueous solution of the polymer compound, prepared in advance to use, has a high viscosity and therefore is involved in problems such as deteriorated workability at the step of, for example, adding.

Generally known pipe jacking additives are constituted of 5 to 10 types of materials and additives such as several types of clays having different particle diameters from each other which clays are added to impart segregation resistance of materials and lubricity, water-soluble polymers are added as thickeners, and fibrous materials are added for suppressing the permeation of water and skids. However, these additives are inferior in segregation resistance in water and viscoelasticity and only insufficient performance is obtained at present. Moreover, these additives must be prepared from 5 to 10 types or more of materials, which complicates the preparation of additives and also makes it difficult to control the qualities of final additives in consideration of the variation of the characteristics of each material.

The studies made relating to JP-A 2003-238222 by the inventors of the present invention have clarified that when clay exists in a slurry, there is the case where an unsatisfactory modifying effect is obtained.

The present invention relates to a slurry rheology modifier having an excellent rheology modifying effect even on a slurry containing clay.

The present invention may provide a surfactant composition being suitable as a slurry rheology modifier having such an excellent rheology modifying effect that it can impart a good thickening effect and a proper segregation resistance of materials even to a slurry containing clay, for example, a hydraulic composition.

<Compound (A)>

Among the compound (A), quaternary salt type cationic surfactants are preferable as those selected from cationic surfactants. As the quaternary salt type cationic surfactant, those containing at least one saturated or unsaturated straight-chain or branched alkyl group having 10 to 26 carbon atoms in their structures are preferable. Examples of the quaternary salt type cationic surfactant include alkyl (10 to 26 carbon atoms) trimethylammonium salts, alkyl (10 to 26 carbon atoms)pyridinium salts, alkyl (10 to 26 carbon atoms)imidazolinium salts and alkyl (10 to 26 carbon atoms)dimethylbenzylammonium salts. Specific examples of the quaternary salt type cationic surfactant include hexadecyltrimethylammonium chloride, hexadecyltrimethylammonium bromide, hexadecyltrimethylammonium methosulfate, octadecyltrimethylammonium chloride, octadecyltrimethylammonium bromide, tallow trimethylammonium chloride, tallow trimethylammonium bromide, hydrogenated tallow trimethylammonium chloride, hydrogenated tallow trimethyl ammonium bromide, hexadecylethyldimethylammonium chloride, octadecylethyldimethylammonium chloride, hexadecylpropyldimethylammonium chloride, hexadecylpyridinium chloride, 1,1-dimethyl-2hexadecylimidazolinium chloride and hexadecyldimethylbenzylammonium chloride. These compounds may be used in combinations of two or more. Specifically, hexadecyltrimethylammonium chloride, octadecyltrimethylammonium chloride, hexadecylpyridinium chloride and the like are preferable from the viewpoint of water solubility and thickening effect. Also, from the viewpoint of thickening effect, the foregoing cationic surfactants having different alkyl chain lengths may be used in combinations of two or more.

<Compound (B)>

Among the compound (B), examples of those selected from anionic aromatic compounds include carboxylic acids having an aromatic ring and their salts, phosphonic acids and their salts and sulfonic acids and their salts. Specific examples of the anionic aromatic compounds include such as salicylic acid, p-toluenesulfonic acid, sulfosalicylic acid, benzoic acid, m-sulfobenzoic acid, p-sulfobenzoic acid, 4-sulfophthalic acid, 5-sulfoisophthalic acid, p-phenolsulfonic acid, m-xylene-4-sulfonic acid, cumenesulfonic acid, methylsalicylic acid, styrenesulfonic acid and chlorobenzoic acid. These compounds may respectively form a salt and may be used in combinations of two or more. However, in the case where the compound is a polymer, the weight average molecular weight of the polymer is preferably less than 500.

As those selected from bromide compounds among the compound (B), inorganic salts are preferable and examples of these inorganic salts include such as sodium bromide, potassium bromide and hydrogen bromide.

<Cationic Polymer (C)>

Examples of the cationic polymer (C) include cationic polymers containing cationic nitrogen and polymers having a quaternary salt structure in their molecules and particularly cationic polymers in which the cationic nitrogen is quaternary nitrogen.

Examples of the cationic polymer (C) include homopolymers of dimethylaminoethyl(meth)acrylate, dimethylaminopropyl(meth)acrylate, (meth)acrylamidoethyldimethylamine, (meth)acrylamidopropyldimethylamine, allylamine, allylmethylamine, allyldimethylamine, diallylamine, diallylmethylamine or the like and copolymers of these monomers and other monomers. Any of the neutralized type and non-neutralized type of these polymers may be used.

Other examples of the cationic polymer (C) include such as polyalkylene polyamines such as diethylenetriamine, triethylenetetramine, tetraethylenepentamine, dipropylenetriamine and tripropylenetetramine and polymers obtained by adding an alkylene oxide having 2 to 4 carbon atoms to these polyalkylene polyamines. Any of the neutralized type and non-neutralized type of these polymers may be used.

Besides the above, polyethyleneimines or polymers obtained by adding an alkylene oxide having 2 to 4 carbon atoms to these polyethyleneimines may be used as the cationic polymer(C).

As the cationic polymer (C), those containing cationic nitrogen are preferable and further, those in which the cationic nitrogen of the cationic polymers is bonded with a group selected from an alkyl group having 1 to 22, a polyoxyalkylene group containing an-oxyalkylene group having 2 to 8 carbon atoms, a hydrogen atom and a group represented by the following formula (1):

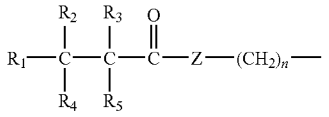

(1)

wherein $R_1$ to $R_5$, which may be the same or different, respectively represent a hydrogen atom or an alkyl or alkenyl group having 1 to 22 carbon atoms, Z represents —O— or —NY— (Y represents a hydrogen atom or an alkyl group having 1 to 10 carbon atoms), n denotes a number from 1 to 10. Here, $R_1$ and $R_3$ may be incorporated into the polymer structure and in this case, $R_1$ and $R_3$ are not present.

Examples of compounds from which the group represented by the formula (1) are derived include a methacryloyloxyethyltrimethylammonium salt, methacryloyloxyethyldimethylethylammonium salt, methacryloyloxypropyltrimethylammonium salt, methacryloyloxypropyldimethylethylammonium salt, methacrylamidoethyltrimethylammonium salt, methacrylamidoethyldimethylethylammonium salt, methacrylamidopropyltrimethylammonium salt, methacrylamidopropyldimethylethylammonium salt, acryloyloxyethyltrimethylammonium salt, acryloyloxyethyldimethylethylammonium salt, acryloyloxypropyltrimethylammonium salt, acryloyloxypropyldimethylethylammonium salt, acrylamidoethyltrimethylammonium salt, acrylamidoethyldimethylethylammonium salt, acrylamidopropyltrimethylammonium salt and acrylamidopropyldimethylethylammonium salt. Among these salts, alkyl sulfates and particularly ethyl sulfates and methyl sulfates are preferable.

The cationic polymer (C) in which the cationic nitrogen is derived from a diallyldialkylammonium salt and preferably a diallyldimethylammonium salt is also preferable. Specific examples of such a compound include copolymers of diallyldimethylammonium salts and acrylic acid type monomers.

Also, examples of the cationic polymer (C) include those having a structure derived from a monomer selected from (meth)acrylic acid type monomers having a cationic group, styrene type monomers having a cationic group, vinylpyridine type monomers, vinylimidazoline type monomers and diallyldialkylamine type monomers.

Examples of the counter ion of the cationic polymer (C) include anionic ions such as a halogen ion, sulfuric acid ion, alkylsulfuric acid ion, phosphoric acid ion and organic acid ion.

Specific examples of the cationic polymer (C) include such as polyallyltrialkylammonium salts such as a polyallyltrimethylammonium salt, poly(diallyldimethylammonium salt), polymethacryloyloxyethyldimethylethylammonium salt, polymethacrylamidopropyltrimethylammonium salt, cationic starch, cationic cellulose and cationic hydroxyethylcellulose. These polymers may be obtained by polymerizing monomers having a quaternary structure or by making a corresponding polymer into a quaternary compound. It is unnecessary that these polymers are homopolymers and these monomers may be copolymerized with copolymerizable monomers according to the need. Specific examples of these copolymers include such as a diallyldimethylammonium salt/$SO_2$ copolymer, diallyldimethylammonium salt/acrylamide copolymer, diallyldimethylammonium salt/acrylic acid/acrylamide copolymer, methacryloyloxyethyldimethylethylammonium salt/vinyl pyrrolidone copolymer and methacrylamidopropyltrimethylammonium salt/vinylpyrrolidone copolymer. These copolymers may contain unreacted monomers, byproducts and polymers having different cation density. These copolymers may be used in combinations of two or more.

Among the above polymers, a cationic polymer selected from a poly(diallyldimethylammonium salt), polymethacryloyloxyethyldimethylethylammonium salt, polymethacrylamidopropyltrimethylammonium salt, mehtacryloyloxyethyldimethylethylammonium salt/vinylpyrrolidone copolymer and methacrylamidopropyltrimethylammonium salt/vinylpyrrolidone copolymer is preferable. Among these compounds, those of which the counter ion is an alkylsulfuric acid ion and particularly ethyl sulfate or methyl sulfate are more preferable from the viewpoint of a rheology modifying effect.

The molecular weight of the cationic polymer (C) is preferably 1000 or more and more preferably 1000 to 3,000,000 and is therefore discriminated from compound (A) in this point. This molecular weight is a weight average molecular weight measured in the following condition by gel permeation chromatography.

Column: α-M (manufactured by Tosoh Corporation, two columns connected with each other Diluent: 0.15 mol/L of Na sulfate, aqueous 1% acetic acid solution Flow rate: 1.0 mL/min Temperature: 40° C.

Detector: R1

As the standard of molecular weight, pullulan is used.

The cationic polymer (C) has a cation density of preferably 0.5 to 10 meq/g, more preferably 1 to 9 meq/g and even more preferably 3 to 8 meq/g from the viewpoint of maintaining viscoelasticity just after a slurry and thereafter with time. The cation density may be measured by the method used in the examples which will be explained below.

<Surfactant Composition>

The compounds (A) and (B) to use in the surfactant composition of the present invention have such a property that, when an aqueous solution $S_A$ of the compound (A) which solution has a viscosity of 100 mPa·s or less at 20° C. is mixed with an aqueous solution $S_B$ of the compound (B) which solution has a viscosity of 100 mPa·s or less at 20° C., the viscosity of the mixed solution is at least 2 times, preferably at least 5 times, more preferably at least 10 times, even more preferably at least 100 times and even more preferably 500 times the viscosity of any one of these aqueous solutions (20° C.) before being mixed.

Here, the viscosity means a value measured at 20° C. by using a B-type viscometer (C rotor or No. 3 rotor, 1.5 r.p.m to 12 r.p.m). In this case, the foregoing viscosity behavior may be developed at any rotation between 1.5 r.p.m to 12 r.p.m. The following viscosities are measured in this condition, unless otherwise noted. Also, in the mixing, these aqueous solutions are mixed in a ratio by weight of 50/50. The viscosity of each aqueous solution of the compounds (A) and (B) at 20° C. before being mixed is preferably 50 mPa·s or less and more preferably 10 mPa·s or less and when both solutions are mixed, the same thickening effect is preferably developed from the viewpoint of operability when the surfactant composition is added to a slurry system. Also, the aqueous solution obtained by mixing compounds (A) and (B) is preferably put in such a state that a structural body such as a monomolecule or associated molecule, micelle or liquid crystal is formed or these structural bodies coexist.

In the present invention, a combination of compound (A) selected from quaternary cationic surfactants and compound (B) selected from anionic aromatic compounds is particularly preferable from the viewpoint that the compounds (A) and (B) form an associated body easily. In the case of this combination, the viscosity of the mixed solution is low even if each is an aqueous concentrated solution and also, the mixed solution develops excellent viscosity characteristics even if the effective concentration of the compounds (A) and (B) in the hydraulic composition is 10% by weight or less when the slurry is a hydraulic composition. Also, each is an aqueous concentrated solution, the viscosity of the mixed solution is low, which is preferable from the viewpoint of workability when the solution is added. This combination can attain segregation resistance of materials in the hydraulic composition even if the amount of the compounds (A) and (B) to be added is small.

Also, a combination of an alkyl (10 to 26 carbon atoms) trimethylammonium salt as compound (A) and a sulfonate having an aromatic ring as compound (B) is particularly preferable for use as a slurry rheology modifier. When the slurry is a hydraulic composition, the effect of the compounds (A) and (B) is produced even if the effective concentration of the hydraulic composition in a water phase is 5% by weight or less. Among these compounds, toluenesulfonic acid, xylenesulfonic acid, cumensulfonic acid and styrenesulfonic acid and styrenesulfonic acid or salts of these compounds are preferable as compound (B) and particularly p-toluenesulfonic acid or its salt are preferable from the viewpoint of avoiding hardening delay.

When the surfactant composition of the present invention is used for a slurry rheology modifier, a combination of the compounds (A) and (B) and the cationic polymer (C) produces such an excellent rheology modifying effect on even a slurry containing clay. Although not wanting to be limited by theory, the reason is as follows: Specifically, in the slurry in which clay exists, compound (A) adsorbs to the clay and there is therefore the case where the formation of string-like micelles which serve to modify rheology is inhibited. However, if the cationic polymer (C) exists like the case of the present invention, the adsorption of the cationic polymer (C) to clay can be prevented because the cationic polymer (C) adsorbs to clay more easily than compound (A). Also, the adsorption of the cationic polymer (C) to clay causes the coagulation of clay particles and also, the surface area of clay is reduced, ensuring that the amount of compound (A) to be adsorbed to clay can be reduced. As a result, string-like micelles (huge micelle associated body) produced by the compounds (A) and (B) are formed sufficiently and therefore, the original effects of the compounds (A) and (B) are maintained.

It is considered that the present invention can prevent compound (A) from adsorbing to clay by the aid of the cationic polymer (C) in the case where sufficient rheology modifying effect is not obtained because of the adsorption of compound (A) to clay, and therefore, rheology modification can be accomplished even in the case where substances having the ability to adsorb compound (A) are present besides the clay. As to the index of the ability to adsorb compound (A), it is preferable to apply the present invention to materials having a chemical equivalent of 0.1 meq or more (0.1 meq/100 g or more) to compound (A) per 100 g. Materials having a chemical equivalent of 1 to 10 meq/100 g in particular have a difficulty in obtaining an intended rheology modifying effect even if the amount of compound (A) to be added is significantly increased. Therefore, the present invention is preferable in such a case. The chemical equivalent of a material to compound (A) can be measured by the method described in the examples which will be explained later.

The surfactant composition of the present invention may be used by preparing formulations containing, for example, compound (A), compound (B) or the cationic polymer (C) in an amount of 0.1 to 100% by weight, more preferably 1 to 100% by weight and even more preferably 5 to 100% by weight respectively and adding each formulation to a slurry such that each compound has the ratio that will be described later. Because the cationic polymer (C)'s viscosity is not increased even if mixed with compound (A) or compound (B), it can be mixed with compound (A) or compound (B) in advance and is preferably mixed with compound (A) in the point that the both have the same types of charge.

The compounds (A) and (B) respectively have a low viscosity even in the state of an aqueous concentrated solution containing each compound singly and are therefore preferably prepared in the form of an aqueous solution. If the effective concentration of each solution before each solution is added to the slurry system is designed to be. preferably 10% by weight or more, more preferably 20% by weight or more, even more preferably 30% by weight or more and even more preferably 40% by weight or more, for example, a storage tank can be small-sized and the productivity can be therefore improved.

The surfactant composition of the present invention may be combined with another surfactant. As the additional surfactant, an amphoteric surfactant and a nonionic surfactant are preferable. Particularly, betaine type compounds and compounds obtained by adding an alkylene oxide to alcohols are preferable.

The surfactant composition of the present invention may be combined with a solvent with the intention of, for example, adjusting viscosity. As the solvent, alcohols and cellosolve type solvents are preferable and propylene glycol is preferable from the viewpoint of rheology modifying effect and flash point.

The surfactant composition of the present invention may include, according to need, other components such as a dispersant, an AE agent, a retardant, an early-strengthening agent, a promoter, a foaming agent, a bubbling agent, an antifoaming agent, a corrosion inhibitor, colorants, a mildew-proofing agent, a crack reducing agent, an expander, dyes, pigments, a scale preventive, a slime treating chemical, an antiseptic and an emulsion. The slurry rheology modifier of the present invention containing the surfactant composition may contain at least one of these components.

When the compounds (A) and (B) and the cationic polymer (C) are added to a slurry, the slurry improved in rheology is obtained. Therefore, no particular limitation is imposed on the style of addition of the surfactant composition according to the present invention to modify the slurry rheology.

The preferred surfactant composition according to the present invention has the characteristics that even if the compounds (A) and (B) are respectively put in the state of a low-viscosity aqueous solution, a mixed solution obtained by mixing both solutions exhibits a high viscosity. It is therefore preferable for modification of the slurry rheology to use the compounds (A) and (B) in an aqueous solution and to add the cationic polymer (C) at a proper position. At this time, when the compounds (A) and (B) are added to a slurry system, both are respectively added in the state of an aqueous solution having a viscosity of 100 mPa·s or less, preferably 50 mPa·s or less and more preferably 10 mPa·s or less at working temperature from the viewpoint of operability.

The ratio (molar ratio of effective components) of compound (A) to compound (B) in the surfactant composition of the present invention for the slurry rheology modifier may be properly determined according to the intended degree of thickening. However, the ratio, compound A/compound B=1/20 to 4/1, preferably 1/3 to 2/1 and more preferably 1/1 to 2/3 from the viewpoint of the viscosity to be obtained and the shape of the associated body. The molar ratio here is calculated from the following equation: [Total mol number of all compounds belonging to compound (A)]/[Total mol number of all compounds belonging to compound (B)].

Also, the cationic polymer (C) is used in a proportion of preferably 1 to 500 parts by weight, more preferably 5 to 400 parts by weight and even more preferably 8 to 300 parts by weight based on 100 parts by weight of compound (A).

The compounds (A) and (B) and the cationic polymer (C) may be respectively used in any of an aqueous solution state and apowder state. Particularly, in any state, the surfactant composition of the present invention can provide good slurry rheology characteristics. When the compounds (A) and (B) and the cationic polymer (C) are prepared in a powder state in advance and used, workability in, for example, the premix use is improved. However, taking it into account to intend to adjust the viscosity of a slurry to a desired value, a method of using the compounds (A) and (B) and the cationic polymer (C) is preferable wherein a filler and the like which are the structural powders of the slurry are not processed by surface treatment using these compounds.

According to the present invention, a slurry containing the surfactant composition of the present invention, water, a hydraulic powder and/or a filler except for clay and clay is provided. The slurry may contain the slurry rheology modifier containing the surfactant composition of the present invention.

The hydraulic powder means a powder having such properties that it is hardened by a hydraulic reaction. Examples of the hydraulic powder include cements and gypsum. Specific examples of the hydraulic powder include hydraulic powder cements such as ordinary portland cement, moderate heat cement, early-strength cement, super early-strength cement, high-belite-containing cement, blast furnace cement, fly-ash cement, alumina cement and silica fume cement and gypsum.

Also, examples of the filler include calcium carbonate, fly-ash, blast furnace slag and silica fume. These powders may be used singly or in combination. Moreover, sand and ballast as aggregates or mixtures of these aggregates may be added to these powders according to the need. Also, the present invention may be applied to inorganic oxide type powders, such as titanium oxide, other than the above or to soils.

Also, the clay is preferably those primarily containing a silicate hydrate mineral (hereinafter referred to as a clay mineral) having a layer structure. Examples of the clay mineral contained as a fine grain mineral in the clay include kaolin minerals (kaolinite, dickite and nacrite), serpentinite (lyserdite, antigorite and chrysotile), mica clay minerals (illite, sericite, glauconite and celadonite) chlorite, vermiculite and smectites (montmorillonite, bidelite, nontronite, saponite and hectorite). Examples of the clay made of these clay minerals include fuller's earth, ball clay, fire clay, pottery stone, talc and pyrophillite. Also, examples of the clay include acid clay which has been subjected to chemical treatment, for example, heat treatment and alkali treatment and Na bentonite and Ca bentonite. Refined bentonite used in cosmetic applications in a producing district is exemplified. Examples of clay manufactured artificially include synthetic mica, synthetic kaolinite and synthetic smectites. Besides the above, Kasaoka clay (trade name, Kanesan Kogyo (K.K.)) used for civil materials is also exemplified. These clays may be used either singly or in combination. The clay so-called in the present invention include, in addition to the foregoing compounds containing clay minerals as major components, those coexisting with fillers except for clay and those present in aggregates such as sand.

The soils are roughly classified into sandy soils reduced in clay content and clay soils having a large clay content and are materials which are a mixture of inorganic materials such as the foregoing clay and organic materials such as putrefied vegetables and organisms. Although the soil is diversified and its definition differs depending on the type of scientific field, the soil so-called in the patent application of this case is residual soil or transported soil geologically and zonal soil, azonal soil and intrazonal soil pedologically. Familiar soil examples include "Fujizuna", "kanuma tsuti" and "akadama" for gardening.

The slurry of the present invention may contain a water reducing agent. As the water reducing agent, a high-performance water reducing agent and high-performance AE water-reducing agent besides general water reducing agents are preferable. Examples of these high-performance water reducing agent and high-performance AE water-reducing agent (hereinafter referred to as a high-performance water reducing agent and the like) include a naphthalene type (Mighty 150, manufactured by Kao Corporation), melamine type (Mighty 150V-2, manufactured by Kao Corporation) and polycarboxylic acid type (Mighty 3000, manufactured by Kao Corporation, Reobuild SP, manufactured by NMB and Aqualock FC600 and Aqualock FC900, manufactured by Nippon Shokubai Co., Ltd.). As the high-performance water reducing agents, a polycarboxylic acid type is desirable from the viewpoint of a small influence on the viscosity and dispersibility of concrete when it coexists with the compounds (A) and (B). The amount of the high-performance water reducing agent and the like is a total of preferably 0.1 to 5% by weight and more preferably 1 to 3% by weight based on the hydraulic powder.

Also, the slurry of the invention may contain aggregates. The aggregates include coarse aggregates and fine aggregates. Aggregates which are usually used in the field of hydraulic compositions may be used as these coarse aggregates and fine aggregates. Although no particular limitation is imposed on the amount of these aggregates to be compounded, it is desirable that 250 to 400 L of coarse aggregates and 250 to 400 L of fine aggregates be contained in 1000 L of the slurry. Also, even in the case of using, as aggregates, sediment, gravel, sand gravel, sand or silt, these aggregates can be used without impairing the viscoelasticity of them by the aid of the surfactant composition of the present invention.

The slurry preferably has a water-powder ratio (weight percentages (% by weight) of water and a powder in the slurry) of preferably 30 to 300%. In the case of, especially, a hydraulic composition, the water-powder ratio is preferably 35 to 250% and more preferably 40 to 200% by weight. Also, the powders used in the slurry may be used either independently or in combination.

Also, a hydraulic powder composition containing the surfactant composition or the rheology modifier of the present invention may be prepared by premixing one or more compound selected from compound (A), compound (B) and the cationic polymer (C) with a hydraulic powder.

When the surfactant composition of the present invention is added to the slurry, compound (A), compound (B) and the cationic polymer (C) may be added in an optional order. Alternatively it is possible that either one of the compounds (A) and (B) is added to the slurry, the other compound is added to the slurry and the cationic polymer (C) maybe added anytime. The following addition process is desirable from the viewpoint of workability: for example, one of the compounds (A) and (B) is added to the slurry in a desired stage and another compound is added to the slurry when it is necessary to increase viscosity wherein the cationic polymer (C) is added together with the compound (A) or (B). Also, the cationic polymer (C) may be used after it is mixed with one or both of the compounds (A) and (B) in advance. The compounds (A) and (B) and the cationic polymer (C) may have a liquid form or a powder form when they are added to the slurry. A kit including a combination of a composition (α) containing the compound (A), a composition (β) containing the compound (B) and a composition (γ) containing the cationic polymer (C) or a kit including a combination of a composition (I) which contains any two of the compound (A), the compound (B) and the cationic polymer (C) but does not contain the remainder one and a composition (II) containing the remainder one which the composition (I) does not contain may be effectively used to modify the slurry rheology. The kit may include another composition according to need.

Also, the surfactant composition of the present invention may be added when manufacturing a slurry. For example, a method is exemplified in which first, a slurry is prepared which contains one of the compounds (A) or (B), the cationic polymer (C), a powder, for example, a hydraulic powder such as cement and water and next the other of the compounds (A) or (B) is added to the slurry.

When, in particular, the surfactant composition of the present invention is used in a slurry system using a hydraulic powder such as cement, it is preferable that the compound (A) or the compound (B) and the cationic polymer (C) be first added in the slurry and then, the remainder compound (B) or (A) be added to the slurry from the viewpoint of suppressing air cells to be entrained during the stirring of the slurry.

In any case, the compounds (A) and (B) are used such that the total effective content of the compounds (A) and (B) is preferably 0.01 to 20% by weight, more preferably 0.1 to 15% by weight and even more preferably 0.1 to 10% by weight in terms of effective concentration in the water phase of the slurry. The cationic polymer (C) is used in an amount of preferably 1 to 500 parts by weight, more preferably 5 to 400 parts by weight and even more preferably 8 to 300 parts by weight based on 100 parts by weight of the compound (A) in the water phase of the slurry.

Although the slurry of the present invention may be used in various applications according to the type of powder, it is preferably used as pipe jacking additives for pipe jacking method. As the composition of the additive (slurry), a filler other than clay and particularly, fly ash is preferable, and, in this case, the density of the additive (slurry) is preferably 1.055 to 1.385 g/cm$^3$ (water-powder ratio: 970 to 100) and more preferably 1.161 to 1.318 g/cm$^3$ (water-powder ratio: 300 to 130) (the density of the fly ash is regarded as 2.25 g/cm$^3$ to calculate).

The slurry of the present invention may be applied as the additive as mentioned above. High viscoelasticity obtained by the present invention enables improvements in the effect of preventing the rupture of the drilled ground, water leakage preventive effect and segregation resistance in water and also the sludge discharge effect is improved because clogging caused by gravel is prevented. Also, the slurry of the present invention maintains its effect during construction due to the effect of the cationic polymer (C) when clay to which the compound (A) is adsorbed is contained in a large amount. Also, when the slurry of the present invention is used as an additive, the number of the types of materials is reduced because this additive itself possesses a high segregation resistance of materials, thickening characteristics, lubricity and water permeation preventive effect. In one example of the formulation, a formulation containing water, a filler other than clay which is one powder selected from fly ash, calcium carbonate, blast furnace slag and silica fume and the surfactant composition of the present invention exhibits a sufficient performance as a pipe jacking additive.

Next, examples according to the present invention will be explained. These examples are intended to describe preferred embodiments of the present invention but are not intended to be limiting of the invention.

EXAMPLES

Example 1

(1) Slurry Raw Materials

As the slurry raw material, the following materials were used.

Hydraulic powder: ordinary portland cement, density: 3.16 g/cm$^3$, Taiheiyo Cement (K.K.)

Compound (A): Hexadecyltrimethylammonium chloride/octadecyltrimethylammonium chloride=50/50 (weight ratio) (used as an aqueous 29 weight-% (hereinafter expressed as wt. %) solution (viscosity at 20° C.: 18 mPa·s))

Compound (B) : Sodium p-toluenesulfonate (used as an aqueous 20 wt. % solution (viscosity at 20° C.: 2.5 mPa·s))

Clay: Kasaoka Clay (Kanesan Kogyo (K.K.))

Additive: Those described in Table 1

The viscosity of an aqueous solution obtained by mixing an aqueous 29 wt. % solution of compound (A) with an aqueous 20 wt. % solution of compound (B) in a ratio of 50/50 was 200,000 mPa·s at 20° C.

(2) Preparation of a Slurry 400 g of cement, 20 g of clay and 400 g of water containing compound (B) and the additives shown in Table 1 (containing 8 g (2 wt. % based on the total weight of water) of an aqueous solution of compound (B) were mixed by a hand mixer for 30 seconds. Then, 8 g (2 wt. % based on the total weight of water) of an aqueous solution of compound (A) was mixed in this mixture, followed by mixing by a hand mixer for 60 seconds.

(3) Evaluation

With regard to the obtained slurry, its viscosity was measured just, 60 minutes and 120 minutes after the slurry was prepared. The viscosity was measured at 20° C. by using Viscotester (using No. 1 rotor) manufactured by Ryon. The results are shown in Table 1. As shown in Table 1, Comparative Product 1 is reduced largely in the viscosity of the slurry with time and Comparative Products 2 to 6 results in segregation of the slurry. In the case of the products of the present invention, on the other hand, the viscosities of all the slurries are stable over time and no segregation occurs. Here, the term "the segregation of the slurry" means that a part of water in the slurry is separated from powder and aggregate and floated on the upper layer of the slurry.

TABLE 1

| | | Additive | | Viscosity (mPa · s/20° C.) | | |
|---|---|---|---|---|---|---|
| | | kind | weight % | After 0 minute | After 60 minutes | After 120 minutes |
| Product of the invention | 1 | Cationic polymer (1) | 34.5 | 6100 | 7000 | 7500 |
| | 2 | Cationic polymer (2) | 34.5 | 7000 | 7800 | 6900 |
| | 3 | Cationic polymer (3) | 34.5 | 7400 | 7400 | 7400 |
| | 4 | Cationic polymer (4) | 34.5 | 7400 | 6800 | 6100 |
| | 5 | Cationic polymer (5) | 34.5 | 6500 | 6800 | 5500 |
| | 6 | Cationic polymer (6) | 34.5 | 6000 | 6500 | 6000 |

TABLE 1-continued

| | | Additive | | Viscosity (mPa · s/20° C.) | | |
|---|---|---|---|---|---|---|
| | | kind | weight % | After 0 minute | After 60 minutes | After 120 minutes |
| | 7 | Cationic polymer (7) | 34.5 | 6000 | 6000 | 6000 |
| | 8 | Cationic polymer (8) | 34.5 | 6000 | 6000 | 6000 |
| | 9 | Cationic polymer (1) | 13.8 | 6000 | 6500 | 7100 |
| Comparative product | 1 | Cationic compound | 34.5 | 6000 | 4500 | 3000 |
| | 2 | $CaCl_2$•$2H_2O$ | 172.5 | 6000 | 1500 | segregation |
| | 3 | $CaCl_2$•$2H_2O$ | 69 | 4900 | 1500 | segregation |
| | 4 | Polymer(1) | 34.5 | 2000 | segregation | segregation |
| | 5 | Polymer (2) | 34.5 | 4000 | 9000 | segregation |
| | 6 | None | — | 2400 | 700 | segregation |

(Note)
"Wt. %" of the additives in the table is the wt. % of the effective content of the additive based on the effective content of compound (A). Also, each polymer is selected from the following.
Cationic polymer (1): Poly(diallyldimethylammonium chloride), manufactured by Aldrich, low-molecular weight product (weight average molecular weight 5000 to 20000 (indicated on a ravel), cation density: 6.13 meq/g (used in the state of an aqueous 40 wt. % solution)
Cationic polymer (2): Poly(diallyldimethylammonium chloride), manufactured by Aldrich, weight average molecular weight 100,000 to 200,000 (indicated on a ravel), cation density: 6.19 meq/g (used in the state of an aqueous 20 wt. % solution)
Cationic polymer (3): Poly(diallyldimethylammonium chloride), manufactured by Aldrich, weight average molecular weight 400,000 to 500,000 (indicated on a ravel), cation density: 6.15 meq/g (used in the state of an aqueous 20 wt. % solution)
Cationic polymer (4): Polymethacryloyloxyethyldimethylethylammoniumethyl sulfate, weight average molecular weight 120,000, cation density: 3.63 meq/g (used in the state of an aqueous 36.5 wt. % solution)
Cationic polymer (5): Diallyldimethylammonium chloride-$SO_2$ copolymer, weight average molecular weight 4,000, trade name: PAS-A-5 (Nittobo (K.K.)), cation density: 4.33 meq/g
Cationic polymer (6): Trade name: Accurac 41 (Mitsui Saitech (K.K.), weight average molecular weight 40,000, cation density: 7.10 meq/g (used in the state of an aqueous 50 wt. % solution)
Cationic polymer (7): Trade name: Accurac 35 (Mitsui Saitech (K.K.), weight average molecular weight 70,000, cation density: 7.11 meq/g (used in the state of an aqueous 50 wt. % solution)
Cationic polymer (8): Trade name: Accurac 57 (Mitsui Saitech (K.K.), weight average molecular weight 250,000, cation density: 7.27 meq/g (used in the state of an aqueous 50 wt. % solution)
Cationic compound: Tetramethylammonium chloride (reagent), molecular weight 109.6, cation density: 9.12 meq/g (effective content: 100%)
Polymer (1): Carboxymethyl cellulose, trade name: CMC1190 (Daicel Chemical Industries, Ltd.)
Polymer (2): Polyvinylpyrrolidone, trade name: K-60 (ISP TECHNOLOGIES INC.)

The cation density of the cationic polymer was measured (colloid titration) in the following manner.

First, the cationic polymer (may be a pure cationic polymer or may be put in a solution state) was dissolved in water adjusted to pH 3.0 by phosphoric acid. A toluidine blue indicator was added to the solution, which was then subjected to titration using a 1/400 N potassium polyvinylsulfate solution, provided that the point at which the color of the solution was changed was regarded as the end point. The cation density was found according to the following equation.

$$\text{Cationdensity (meq/g)}=(1/400)\times f\times[(\text{mL})/1000]\times 1000\times 1/[(\text{g})\times(\%)/100]$$

where:
f: Factor of 1/400 N potassium polyvinylsulfate solution;
(mL): Amount of the potassium polyvinylsulfate solution to be added;
(g): Amount of the sample; and
(%): Concentration of the sample.

Example 2

Compound (A), compound (B) and additives which were used in Example 1 were used to prepare a pipe jacking additive suitable for a driving construction method. Specifically, 100 g of fly ash (commercially available product (manufactured by The Kansai Electric Power Co., Ltd.), density: 2.25 g/cm$^3$) was mixed with 155 g of water (including 2.33 g (1.5 wt. % based on the total amount of water) of an aqueous solution of compound (B) and additives in the amounts shown in Table 2) by a hand mixer for 30 seconds. Then, 2.33 g (1.5 wt. % based on the above total amount of water) of an aqueous solution of compound (A) was mixed with the mixture, which was then mixed by a hand mixer for 60 seconds to obtain a slurry. The slurry had a water-powder ratio of 150% and a density of 1.286 g/cm$^3$.

A model soil (bulk density: 1.087 g/cm$^3$) estimated as a sandy soil prepared by blending Kasaoka clay and mountain sand from Kimitsu in Chiba prefecture in a ratio of 1:3 was made. The obtained slurry was blended with the model soil such that the ratio by weight of the slurry/the model soil was 1.0 or 2.0 and the mixture was stirred for 60 seconds by a hand mixer. The viscosity of the mixture was measured at 20° C. just immediately (0 minute after) and 60 minutes after the preparation of the mixture by a B-type viscometer (rotation: 6 rpm). The results are shown in Table 2. As shown in Table 2, the viscosity is not increased with time in the slurry/model soil mixture system of the comparative products 2-1 and 2-2, whereas the viscosity is significantly increased with time in all the example products of the present invention.

TABLE 2

| | | Additive | | Slurry/model soil | Viscocosity (mPa · s/20° C.) | |
|---|---|---|---|---|---|---|
| | | kind | weight % | weight ratio | After 0 minutes | After 60 minutes |
| Product of the invention | 2-1 | Cationic polymer (6) | 85.3 | 1.0 | 7400 | 10300 |
| | 2-2 | Cationic polymer (6) | 170.6 | 1.0 | 8600 | 12500 |
| | 2-3 | Cationic polymer (1) | 170.6 | 1.0 | 9000 | 13000 |

TABLE 2-continued

| | Additive | | Slurry/model soil | Viscocosity (mPa · s/20° C.) | |
|---|---|---|---|---|---|
| | kind | weight % | weight ratio | After 0 minutes | After 60 minutes |
| | 2-4 Cationic polymer (6) | 85.3 | 2.0 | 9600 | 5000 |
| | 2-5 Cationic polymer (6) | 170.6 | 2.0 | 11500 | 15000 |
| | 2-6 Cationic polymer (1) | 170.6 | 2.0 | 13000 | 15000 |
| | 2-7 Cationic polymer (6) | 341.2 | 2.0 | 19200 | 32400 |
| Comparative product | 2-1 None | — | 1.0 | 1300 | 1100 |
| | 2-2 None | — | 2.0 | 2000 | 1400 |

Example 3

(1) Formulation of Concrete

TABLE 3

| W/C (%) | W/P (%) | W (g) | C (g) | Stone dust (g) | S Sand 1 (g) | S Sand 2 (g) | High-performance water reducing agent (wt. % to P) |
|---|---|---|---|---|---|---|---|
| 479 | 39 | 206 | 43 | 491 | 210 | 489 | 3.25 |

Note)
P: Total amount by weight of the cement (C) and the stone dust
Cement (C): Ordinary portland cement (commercially available product, density: 3.16 g/cm$^3$)
Stone dust: Calcium carbonate powder (manufactured by Shimizu Kogyo, density: 2.72 g/cm$^3$)
Sand 1: Crushed sand from Hyogo prefecture (density: 2.57 g/cm$^3$)
Sand 2: Sea sand from Saga prefecture (density: 2.57 g/cm$^3$)
High-performance water reducing agent: Polycarboxylic acid type high-performance water reducing agent "Mighty 3000" (manufactured by Kao Corporation)

(2) Preparation of Mortar

A cement (C) and a fine aggregate (S) were poured into a mortar mixer in the formulation condition shown in Table 3, followed by dry mixing for 10 seconds, and compound (B) and a high-performance water reducing agent which were used in Example 1 and kneading water (W) containing the additive used in Example 1 were added to the mixture, followed by kneading for 30 seconds. Compound (A) used in Example 1 was added and the mixture was kneaded for an additional 90 seconds. The fluidity and viscosity of the resulting mortar were measured just immediately(0 minute after), 20 minutes, 40 minutes and 60 minutes after the preparation of the mortar. The fluidity was measured in the following manner: the prepared mortar was filled in a mortar cone, which was then vertically pulled up to measure the diameter of the mortar which came to a stand still. The viscosity was measured at 20° C. using a Viscotester manufactured by Ryon (using No. 1 rotor). The amount of the compounds (A) and (B) used was 4.0% by weight based on the total amount of the kneading water and the amounts of the additives was such as those shown in Table 4. The sands 1 and 2 used in this example are respectively fine aggregates including many fine particles such as clay and have the ability of adsorbing compound (A) (hereinafter referred to as compound (A)—adsorbing ability") as much as 1.3 meq/100 g and 1.2 meq/100 g respectively. Here, the compound (A)-adsorbing ability was found in the following manner.

An aqueous 29 wt. % solution of a mixture (weight ratio: 50:50, molecular weight: 330.71) of hexadecyltrimethylammonium chloride and octadecyltrimethylammonium chloride was used as compound (A) 8.2 g of this aqueous compound (A) solution was diluted with water to a total volume of 200 mL, which was put into a 800 mL lidded glass bottle (manufactured by Seisho (K.K.)) together with 400 g of a test substance (sand), followed by shaking the bottle by hand for 10 seconds to mix these components. Then, the mixture was allowed to stand for 50 seconds to take the supernatant. The residual concentration of compound (A) in the supernatant was found by a calibration curve method using a TOC (total organic carbon analyzer). From the residual concentration α (mg/L), the compound (A)-adsorbing ability was found according to the following equation.

$$\text{Compound (A)-adsorbing ability [meq/100 g]}=[(8.2\times 0.29\times 1000)-\alpha\times 0.2)\div 400\div 330.71\times 100$$

TABLE 4

| | Additive kind | Weight % | Fruidity (mm) After 0 minute | After 20 minutes | After 40 minutes | After 60 minutes | Viscosity (mPa · s/20° C.) After 0 minute | After 20 minutes | After 40 minutes | After 60 minutes |
|---|---|---|---|---|---|---|---|---|---|---|
| Product of the invention | 3-1 Cationic polymer (1) | 8.6 | 235 | 238 | 229 | 221 | 15000 | 17000 | 17000 | 17000 |
| | 3-2 Cationic polymer (1) | 17.4 | 230 | 235 | 225 | 218 | 15500 | 18000 | 18000 | 17000 |
| | 3-3 Cationic polymer (6) | 8.6 | 230 | 233 | 225 | 215 | 15000 | 18500 | 18000 | 17000 |
| Comparative product | 3-1 None | — | 242 | 261 | 285 | 324 | 8000 | 3900 Segregation | 3500 Segregation | 3400 Segregation |
| | 3-2 Polymer (1) | 17.4 | 245 | 270 | 295 | 340 | 8000 | 3500 Segregation | 3000 Segregation | 2500 Segregation |

In all of Comparative products 3-1 and 3-2, material segregation was observed after 20 minutes. In the example products3-1 to 3-3 of the present invention, on the other hand, no material segregation arose with time and variations in fluidity and viscosity were reduced. The products of the present invention are therefore useful as pipe jacking additives for driving construction methods.

The invention claimed is:

1. A surfactant composition comprising a cationic surfactant as compound (A), at least one compound as compound (B) selected from the group consisting of anionic aromatic compounds and bromide compounds, and a cationic polymer (C), wherein compounds (A) and (B) are selected for the surfactant composition when meeting the condition wherein a combination of the compounds (A) and (B) ensures that the viscosity at 20° C. of a solution prepared by mixing an aqueous solution SA, which solution has a viscosity of 100 mPa·s or less at 20° C., of compound (A) with an aqueous solution SB, which solution has a viscosity of 100 mPa·s or less at 20° C., of compound (B) in a ratio by weight of 50/50 is at least two times the viscosity of any one of the aqueous solutions at 20° C. before being mixed;

wherein the cationic polymer (C) has a cation density of from 0.5 to 10 meq/g and a molecular weight of 1,000 to 500,000; wherein the cationic polymer (C) comprises a cationic nitrogen that is bonded with at least one group selected from the group consisting of an alkyl group having 1 to 22 carbon atoms, a polyoxyalkylene group containing an oxyalkylene group having 2 to 8 carbon atoms, a hydrogen atom and a group represented by the following formula (1):

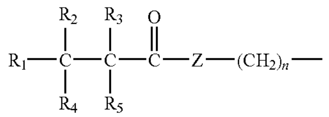

(1)

wherein $R_1$ to $R_5$, which may be the same or different, respectively represent a hydrogen atom or an alkyl or alkenyl group having 1 to 22 carbon atoms, Z represents —O— or —NY—, wherein Y represents a hydrogen atom or an alkyl group having 1 to 10 carbon atoms, and n denotes a number from 1 to 10, provided that $R_1$ and $R_3$ may be incorporated into the polymer structure and in this case, $R_1$ and $R_3$ are not present; and wherein the cationic polymer (C) has a structure derived from a monomer selected from at least one or more monomers selected from the group consisting of a (meth)acrylic acid monomer having a cationic group and a diallyldialkylamine type monomer.

2. The surfactant composition according to claim 1, wherein the cationic nitrogen of the cationic polymer (C) is a quaternary nitrogen.

3. The surfactant composition according to claim 1, wherein the cationic nitrogen of the cationic polymer (C) is derived from a diallyldimethylammonium salt.

4. The surfactant composition according to claim 1, in which 1 to 500 parts by weight of the cationic polymer (C) is contained per 100 parts by weight of the compound (A).

5. A kit to obtain the surfactant composition according to claim 1, comprising a combination of a composition (α) containing the compound (A), a composition (β) containing the compound (B) and a composition (γ) containing the cationic polymer (C) or a combination of a composition (I) which contains any two of the compound (A), the compound (B) and the cationic polymer (C) but does not contain the remainder one and a composition (II) containing the remainder one which the composition (I) does not contain.

6. A slurry rheology modifer comprising the surfactant composition according to claim 1.

7. A slurry comprising the surfactant composition according to claim 1, water, a hydraulic powder and/or a filler other than clay and clay.

8. The slurry according to claim 7, further comprising a high-performance water reducing agent or a high-performance AE water reducing agent.

9. A slurry according to claim 7, as a pipe jacking additive for pipe jacking method.

10. A method of modifying slurry rheology, comprising the step of adding the surfactant composition according to claim 1 to the slurry.

11. The method according to claim 10, in which the kit according to claim 9 is used.

12. A method of pipe jacking, comprising using the slurry according to claim 7 as a pipe jacking additive.

* * * * *